US012759406B2

(12) United States Patent
Kilian et al.

(10) Patent No.: US 12,759,406 B2
(45) Date of Patent: Oct. 13, 2026

(54) MONITORING THE FUNCTIONAL CAPABILITY OF ELECTRICAL BRAKE RESISTORS IN A VEHICLE

(71) Applicant: Siemens Mobility GmbH, Munich (DE)

(72) Inventors: Lennart Kilian, Gauting (DE); Jürgen Quindt, Röthenbach an der Pegnitz (DE); Frank Budzinski, Herzogenaurach (DE)

(73) Assignee: Siemens Mobility GmbH, Munich (DE)

(*) Notice: Subject to any disclaimer, the term of this patent is extended or adjusted under 35 U.S.C. 154(b) by 336 days.

(21) Appl. No.: 18/693,624

(22) PCT Filed: Aug. 30, 2022

(86) PCT No.: PCT/EP2022/073999
§ 371 (c)(1),
(2) Date: Mar. 20, 2024

(87) PCT Pub. No.: WO2023/041318
PCT Pub. Date: Mar. 23, 2023

(65) Prior Publication Data

US 2024/0383337 A1 Nov. 21, 2024

(30) Foreign Application Priority Data

Sep. 20, 2021 (DE) ..................... 10 2021 210 433.9

(51) Int. Cl.
*B60L 3/00* (2019.01)
*B60L 7/02* (2006.01)

(52) U.S. Cl.
CPC ............... *B60L 3/0076* (2013.01); *B60L 7/02* (2013.01); *B60L 2200/26* (2013.01)

(58) Field of Classification Search
CPC ........ B60L 3/007; B60L 7/02; B60L 2200/26; B60L 3/12
See application file for complete search history.

(56) References Cited

U.S. PATENT DOCUMENTS 3,584,921 A * 6/1971 Crawford .............. B60T 8/3245 303/DIG. 8
4,095,153 A * 6/1978 Matty ........................ B60L 7/26 318/375

(Continued)

FOREIGN PATENT DOCUMENTS

DE 102016101075 A1 8/2016
DE 102016206053 A1 11/2016

(Continued)

*Primary Examiner* — Henry Y Liu
(74) *Attorney, Agent, or Firm* — Laurence A. Greenberg; Werner H. Stemer; Ralph E. Locher

(57) ABSTRACT

A vehicle, particularly a rail vehicle, includes at least one brake resistor assembly having electrical brake resistors which can receive electrical braking energy and convert the electrical braking energy into waste heat during braking operation of the vehicle. The brake resistors are divided into a first subgroup and a second subgroup, the first sub-group and the second sub-group are electrically connected in parallel, and an evaluating device monitors functional capability of the brake resistors on the basis of a measured variable indicating a differential current between a first subgroup current flowing through the first subgroup and a second subgroup current flowing through the second sub-group. A method for monitoring electrical braking resistors of a vehicle is also provided.

14 Claims, 3 Drawing Sheets

(56) References Cited

U.S. PATENT DOCUMENTS 4,282,466 A * 8/1981 Matty ........................ H02P 3/08 318/434
4,671,576 A * 6/1987 Fourie ................... B60T 8/1705 303/3
5,261,025 A * 11/1993 Post ........................ H02P 7/281 388/903
5,661,378 A * 8/1997 Hapeman .................. B60L 3/10 318/362
7,315,144 B2 * 1/2008 Imaie .................... B60L 3/0076 318/380
7,571,683 B2 * 8/2009 Kumar .................... B60L 50/51 105/49
8,327,623 B2 * 12/2012 Raman ..................... B60K 6/46 60/303
8,502,496 B2 * 8/2013 Hofheinz .............. B60L 3/0023 180/65.265
8,640,629 B2 * 2/2014 Barbee ...................... B60L 7/24 105/35
8,981,699 B2 * 3/2015 Obata ................... B60L 3/0069 324/544
9,233,612 B2 * 1/2016 Kumar ...................... B60L 9/02
9,647,581 B2 * 5/2017 Saitou ................... H02P 29/024
9,669,732 B2 * 6/2017 Cui ......................... H02P 27/08
10,391,868 B2 * 8/2019 Karipidis ................. H01C 1/08
10,823,783 B2 * 11/2020 Saito ....................... H02P 27/06
2005/0189886 A1 * 9/2005 Donnelly ................ B61C 15/12 318/52
2005/0235865 A1 * 10/2005 Kumar .................... B60L 50/53 105/61
2006/0181235 A1 * 8/2006 Imaie ........................ B60L 7/06 318/375
2011/0061364 A1 * 3/2011 Raman ..................... B60K 6/46 477/4
2011/0109158 A1 * 5/2011 Olsen ........................ B60L 7/10 307/10.1
2011/0273139 A1 * 11/2011 Hofheinz .............. B60L 3/0023 320/109
2013/0033214 A1 * 2/2013 Obata ................ G01R 31/1227 324/765.01
2013/0167752 A1 * 7/2013 Barbee ...................... B60L 7/24 105/1.4
2016/0116519 A1 * 4/2016 Premerlani .......... G01R 31/006 324/549
2017/0129364 A1 * 5/2017 Cui ....................... B60L 15/002
2018/0312065 A1 * 11/2018 Karipidis ............... B61D 17/02
2022/0379741 A1 * 12/2022 Slepchenkov .......... B60L 50/66
2023/0010566 A1 * 1/2023 Slepchenkov .......... B60L 50/66
2025/0100400 A1 * 3/2025 Slepchenkov .......... B60L 50/66

FOREIGN PATENT DOCUMENTS

DE 102017207274 B3 12/2017
DE 102018124641 A1 4/2019
EP 2657060 A1 10/2013

* cited by examiner

MONITORING THE FUNCTIONAL CAPABILITY OF ELECTRICAL BRAKE RESISTORS IN A VEHICLE

FIELD AND BACKGROUND OF THE INVENTION

The invention relates to a vehicle, in particular a rail vehicle, with at least one brake resistor assembly having electrical brake resistors, wherein the brake resistors can receive electrical braking energy during a braking operation of the vehicle or the electrical drive of the vehicle and can convert the electrical braking energy into waste heat.

A rail vehicle is known from the unexamined German patent application DE 10 2015 203 689 A1 in which a brake resistor assembly is pivotably mounted in the region of the vehicle outer shell and can be brought from a pivoted-in position into a pivoted-out position and vice versa by means of pivoting. It is possible by pivoting-out the brake resistor assembly to guide an airflow through an opening in the vehicle outer shell into the vehicle interior so as to cool or to dissipate heat from the brake resistor assembly.

SUMMARY OF THE INVENTION

The object underlying the invention is to provide a vehicle of the type mentioned in the introduction with a possibility of monitoring the functional capability of the brake resistors.

This object is achieved in accordance with the invention by a vehicle and also a method having the respective features in accordance with the independent claims. Respective embodiments are disclosed in the dependent claims.

Accordingly, it is provided in accordance with the invention that the brake resistors are divided into a first and a second subgroup, the first and second subgroup are electrically connected in parallel, and an evaluating facility is provided that monitors a functional capability of the brake resistors on the basis of a measured value that indicates a differential current between a first subgroup current flowing through the first subgroup and a second subgroup current flowing through the second subgroup.

A fundamental advantage of the vehicle in accordance with the invention is that by dividing the brake resistors into two subgroups it becomes possible to determine a failure of individual brake resistors merely on the basis of the differential current or the measured value that indicates the differential current. The inventive idea resides in the fact that each failure of a brake resistor shifts the current ratio between the two subgroups and this shift is reflected in the differential current. Monitoring the differential current therefore makes it particularly easy to identify a failure of brake resistors.

The differential current can be detected particularly easily using a summation current transformer. Accordingly, it is regarded as advantageous if a summation current transformer is provided through which the first and the second subgroup currents are conducted with inverse current flow direction with respect to one another, and the summation current transformer generates the measured value that indicates the differential current between the two subgroup currents and outputs to the evaluating facility.

In accordance with a first embodiment variant, it is provided that a resistance value of the first subgroup and a resistance value of the second subgroup are of equal size.

The brake resistors are preferably connected in parallel in the respective subgroup.

Identical resistance values of the two subgroups can be achieved in a particularly simple and thus advantageous manner if the resistance values of all the brake resistors are of equal or approximately equal size and both subgroups have an identical number of parallel-connected brake resistors.

The evaluating facility preferably generates a deviation signal if the measured value indicates a differential current that according to amount exceeds a predetermined base threshold value. The latter variant is based on the consideration that the differential current would be zero or at least approximately zero if there is no fault so that a significant differential current is an indication of a fault.

In order to know at any time how many brake resistors have already failed, it is regarded as advantageous if the evaluating facility monitors the differential current with regard to its progression over time and in the event of differential current jumps in each case detects the jumping direction of the differential current jumps.

It is advantageous if the evaluating facility generates a first counter reading and a second counter reading, wherein the first counter reading indicates the number of jumps in one of the two possible variation directions and thus the number of failed brake resistors in one of the two subgroups and the second counter reading indicates the number of the jumps in the other of the two possible variation directions and thus the number of failed brake resistors in the other subgroup.

In accordance with a second embodiment variant, it is provided that the resistance value of the first subgroup is smaller by a predetermined additional resistance value than the resistance value of the second subgroup, wherein the additional resistance value is in particular greater than the resistance value of each individual brake resistor of the first subgroup.

In addition, the first subgroup preferably has an additional resistor, with the additional resistance value, connected in parallel to the brake resistors of said subgroup.

The additional resistance value of the additional resistor is in this case for example between 1.5 times and 2.5 times the greatest of the resistance values of the brake resistors of the first subgroup.

In the case of the second embodiment variant, it is moreover regarded as advantageous if the first and the second subgroup have the same number of parallel-connected brake resistors having resistance values of equal size, wherein the first subgroup additionally has the additional resistor (Rz).

In the case of the second embodiment variant, it can alternatively be provided in an advantageous manner that the first and the second subgroup in each case have the same number of parallel-connected brake resistors, wherein the resistance values of the brake resistors of the two subgroups are of equal size with the exception of one resistor in one of the subgroups. The resistance value of the resistor which forms the exception resistance is in this case preferably twice as large as the resistance value of all the other resistors.

The evaluating facility preferably generates a failure signal if in a braking operation of the vehicle the measured value indicates a differential current of zero. Owing to the different resistance values of the two subgroups, it is necessary during a current flow, in other words for example during the braking operation, to always cause a differential current due to the additional resistance value. If this is not the case, there is a fault for example on account of a cable break, which is indicated by the failure signal.

The evaluating facility preferably generates a deviation signal if in a braking operation of the vehicle the measured value indicates a differential current that according to amount deviates from a predetermined desired differential current value or deviates from this by more than a predetermined extent.

The desired differential current value in this case preferably corresponds to the current flow that would have to be caused due to the additional resistance value or would have to flow due to the additional resistance value if both subgroups were free of failure during braking operation.

It is also regarded as advantageous in the case of the second embodiment variant if the evaluating facility monitors the differential current with regard to its progression over time and in the event of differential current jumps in each case detects the jump direction of the differential current jumps.

In this case, the evaluating facility generates a first counter reading and a second counter reading, wherein the first counter reading indicates the number of jumps in one of the two possible variation directions and thus the number of failed brake resistors in one of the two subgroups, and the second counter reading indicates the number of jumps in the other of the two possible variation directions and thus the number of failed brake resistors in the other subgroup.

The brake resistors are preferably passively cooled brake resistors that can be designed in particular as tube heating resistors.

The invention moreover relates to a method for monitoring electrical brake resistors of a vehicle that can receive electrical braking energy during a braking operation of the vehicle and can convert the electrical braking energy into waste heat.

In accordance with the invention, provision is made for a functional capability of the brake resistors to be monitored, said brake resistors being divided into a first and a second subgroup, wherein the first and the second subgroup are electrically connected in parallel, on the basis of a measured value that indicates a differential current between a first subgroup current flowing through a first subgroup and a second subgroup current flowing through a second subgroup.

It is particularly advantageous that the method in accordance with the invention can be applied in a rail vehicle, in particular a rail vehicle for the high-speed field.

In relation to the advantages of the method in accordance with the invention and advantageous embodiments of the method in accordance with the invention reference is to be made to the above statements in relation to the vehicle in accordance with the invention and its advantageous embodiments.

The invention is further explained below with the aid of exemplary embodiments. In the drawings in an exemplary manner.

DETAILED DESCRIPTION OF THE INVENTION

Figure 1:
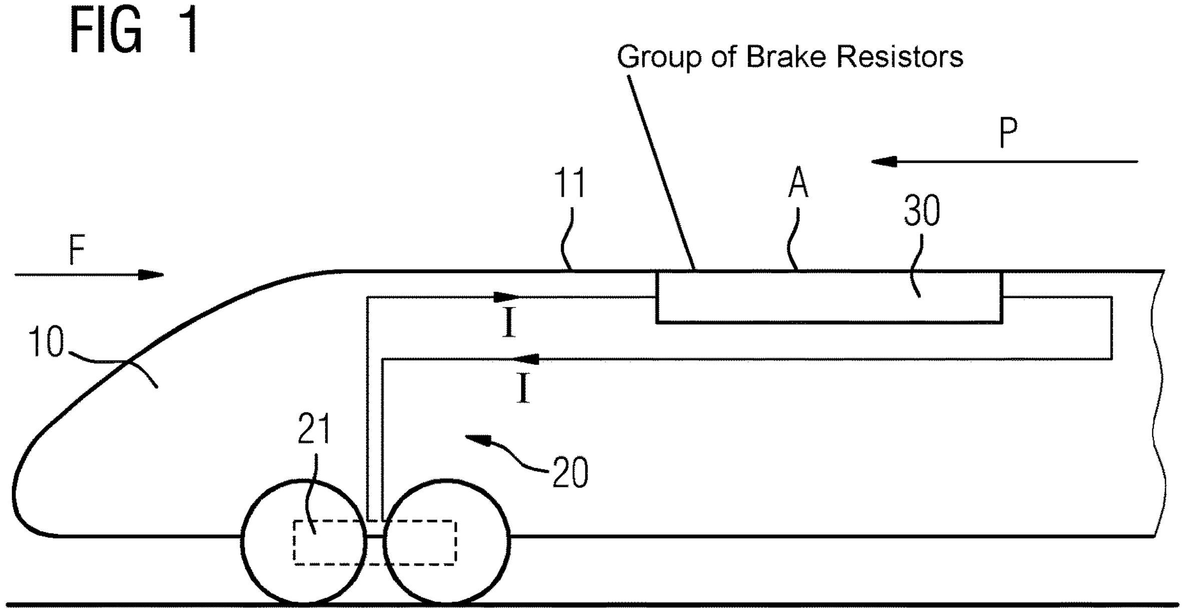
FIG. 1 shows in a schematic representation an exemplary embodiment for a high-speed rail vehicle in accordance with the invention from the side.

In the figures, for the sake of clarity for identical or comparable components the same reference characters are always used.

FIG. 1 illustrates in a schematic representation from the side an exemplary embodiment for a rail vehicle 10. The rail vehicle 10, for example a high-speed rail vehicle that is designed for a maximum speed of 250 km/h, is equipped with one or multiple braking facilities 20 that in each case have one or multiple groups of brake resistors. Such a group of brake resistors is illustrated in FIG. 1. This group is hereafter also called brake resistor assembly 30.

In the case of the exemplary embodiment in accordance with FIG. 1, the brake resistor assembly 30 itself forms a section A of the vehicle shell 11, which is permanently closed and smooth on the outside and around which the airstream F flows aerodynamically without turbulence when the high-speed rail vehicle 10 is traveling. The permanently closed section A of the vehicle shell 11 is preferably free from auxiliary operations, in other words it does not have any mechanically moving parts for influencing the air flow or airstream F that passes the section A or the vehicle shell 11.

If the high-speed rail vehicle 10 during a journey along the arrow direction P, in other words during a journey from the right-hand side to the left-hand side in FIG. 1, is braked by means of the braking facility 20, a braking current I is fed from an electrodynamic generator 21 (not illustrated further) of the electrodynamic braking facility 20 into the brake resistor assembly 30. The braking current I leads to a heating of the brake resistor assembly 30. The heat is preferably predominantly, in particular over 90%, dissipated via convection to the airstream F or the ambient air that is flowing around the vehicle shell 11 and thus section A. In other words, the heat is thus dissipated largely by convection and less or only to an insignificant extent via the emission of heat radiation.

In the case of the embodiment variant in accordance with FIG. 1, the brake resistor assembly 30 itself directly forms the section A of the vehicle shell 11 around which the airstream F flows on the outside. Alternatively, the brake resistor assembly 30 can also be arranged in the direct vicinity of a section A of the vehicle shell 11 around which the airstream F flows on the outside. Such an embodiment variant is illustrated in an exemplary manner in FIG. 2. Despite the certain spacing d between the brake resistor assembly 30 and the vehicle shell 11, it is nevertheless possible for the heat to flow off in the direction of the vehicle shell 11 and to be dissipated there by convection to the ambient air or to the airstream F.

It is also possible that air flows through the brake resistors of the brake resistor assembly 30 in order to improve a dissipation of heat. For example, as is disclosed in the unexamined German patent application DE 10 2015 203 689 A1 mentioned in the introduction an airflow is guided through an opening in the vehicle outer shell into the vehicle interior by pivoting out the brake resistor assembly so as to cool or to dissipate heat from the brake resistor assembly.

The brake resistors of the brake resistor assembly 30 are preferably passively cooled tube heating elements.

Figure 2:
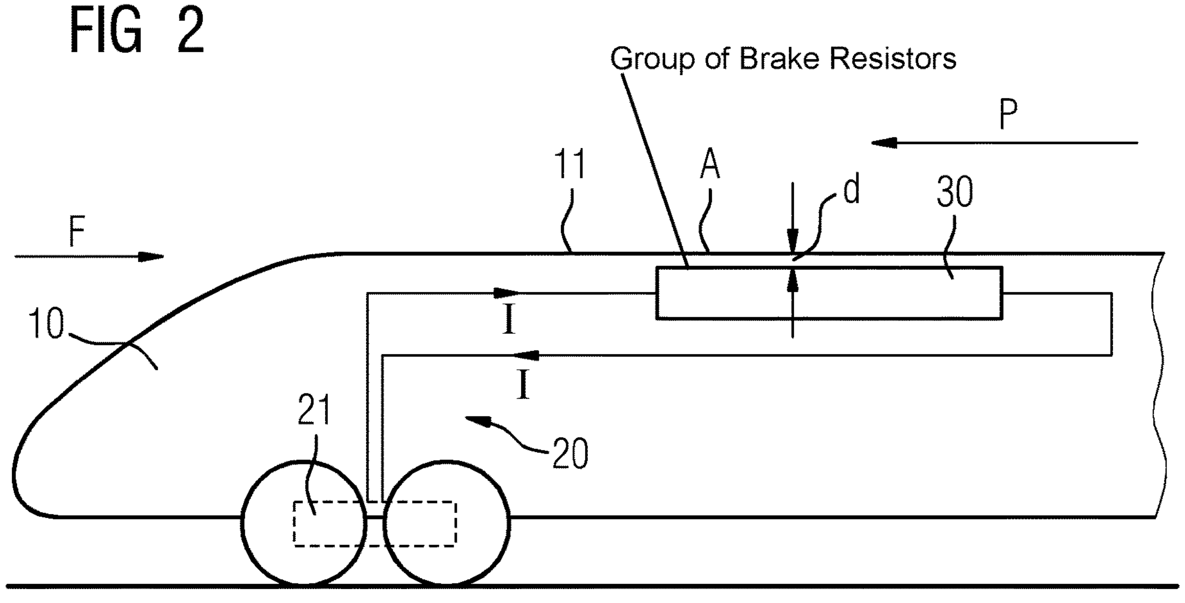
FIG. 2 shows in a schematic representation a further exemplary embodiment for a high-speed rail vehicle in accordance with the invention from the side.
Figure 3:
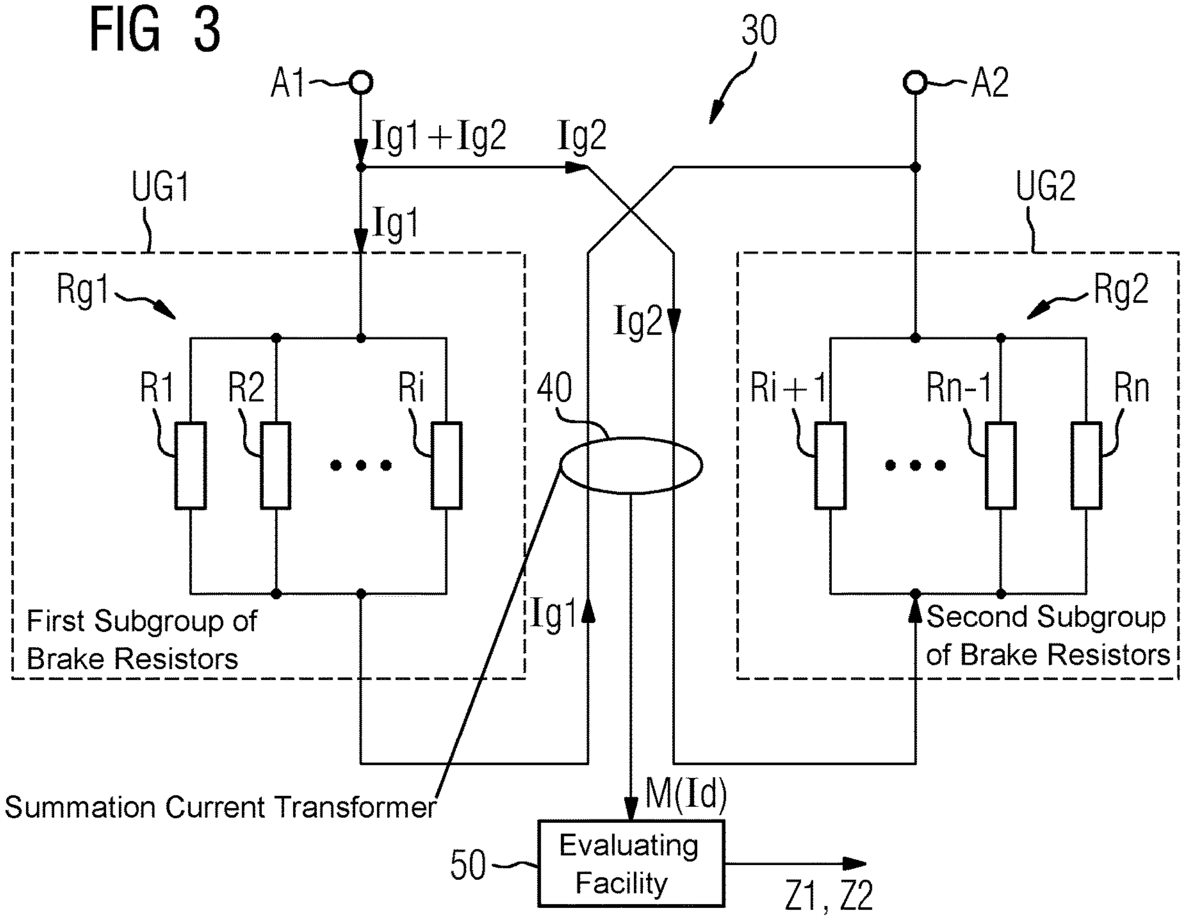
FIG. 3 shows an exemplary embodiment for a brake resistor assembly for the rail vehicles in accordance with FIGS. 1 and 2.

FIG. 3 further illustrates in detail an exemplary embodiment for a brake resistor assembly 30 that can be used in the high-speed rail vehicles 10 in accordance with FIG. 1 or 2.

The brake resistor assembly 30 in accordance with FIG. 3 comprises a first subgroup UG1 and a second subgroup UG2 that in each case have one or more brake resistors. The first subgroup UG1 in the case of the exemplary embodiment in accordance with FIG. 3 comprises the brake resistors R1 to Ri (i is a natural number) and the second subgroup UG2 comprises the brake resistors Ri+1 to Rn (n is a natural number with n>i).

The brake resistors R1-Rn are connected in parallel in their respective subgroup UG1 or UG2. The two subgroups UG1 and UG2 are likewise connected in parallel relative to one another between the connectors A1 and A2 of the brake resistor assembly 30.

A first subgroup current Ig1 flowing through the first subgroup UG1 and a second subgroup current Ig2 flowing through the second subgroup UG2 are conducted with current flow directions that are inverse with respect to one another through a summation current transformer 40 that generates a measured value M that indicates the differential current Id=Ig1–Ig2 between the two subgroup currents Ig1 and Ig2 and outputs this measured value to a downstream evaluating facility 50.

The evaluating facility 50 monitors the functional capability of the brake resistors R1-Rn on the basis of the measured value M.

In the case of the exemplary embodiment in accordance with FIG. 3 it is assumed by way of example that the resistance value Rg1 of the first subgroup UG1 and the resistance value Rg2 of the second subgroup UG2 and thus also the corresponding conductivity values are of equal size, the following thus applies:

$$\sum_{p=1}^{i} 1/R_p = \sum_{p=i+1}^{n} 1/R_p$$

The parity of the resistance values Rg1 and Rg2 of both subgroups UG1 and UG2 can be achieved in a simple manner and with a minimal number of different components if all the brake resistors R1-Rn of the two subgroups UG1 and UG2 (taking into consideration usual component tolerances or at least nominally) are of equal size and the subgroups UG1 and UG2 in each case have the same number of brake resistors R1-Rn, the following thus applies:

$$i = n/2,$$

wherein n is an even number.

If it is furthermore assumed that when bringing the brake resistor assembly 30 into operation at the point in time t=0 this brake resistor assembly is operating without fault and all the brake resistors R1-Rn have a part current flowing through them, the differential current Id is thus equal to zero because the two subgroup currents Ig1 and Ig2 are of equal size:

$$Id(t=0) = Ig1(t=0) - Ig2(t=0) = 0$$

If one of the brake resistors R1-Rn now fails in one of the subgroups UG1 and UG2 and current no longer flows through it, this will have an effect on the differential current Id.

Figure 4:
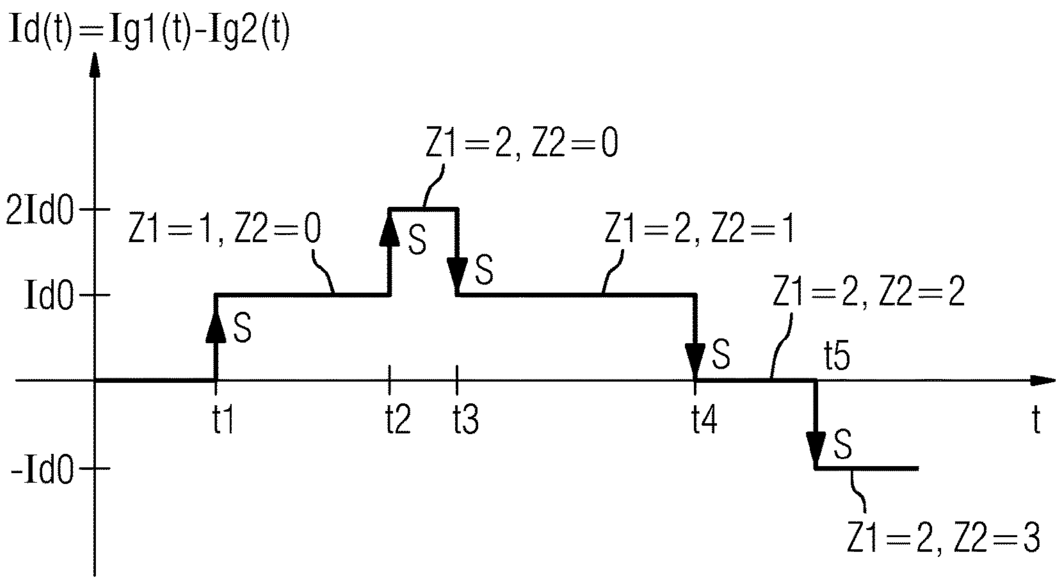
FIG. 4 shows a possible progression over time of differential current jumps in the case of failures of brake resistors of the brake resistor assembly in accordance with FIG. 3.

FIG. 4 illustrates by way of example the progression of differential current Id over the time t during the braking operation and for the case that initially in the second subgroup UG2 two of the brake resistors Ri+1 to Rn fail one after the other and subsequently in the first subgroup UG1 three of the brake resistors R1–Ri fail one after the other.

It is apparent that on account of the failure of two of the brake resistors Ri+1 to Rn in the second subgroup UG2 the differential current Id initially increases in the positive direction because proportionally more current will flow through the first subgroup UG1 than through the second. Two chronologically offset differential current jumps S occur, the jump direction of which indicates that the fault has occurred in the second subgroup UG2.

The evaluating facility 50 detects these differential current jumps S and generates a first counter reading Z1 and a second counter reading Z2.

The first counter reading Z1 indicates the number of the differential current jumps S in the positive variation direction and thus the number of failed brake resistors in the second subgroup UG2.

The second counter reading Z2 indicates the number of differential current jumps S in the negative variation direction and thus the number of failed brake resistors in the first subgroup UG1.

Until the point in time t1 (see FIG. 4) both counter readings Z1 and Z2 are of equal size and amount to zero.

At the point in time t1, one of the brake resistors Ri+1 to Rn in the second subgroup UG2 fails which causes a differential current jump S in the positive variation direction and the first counter reading Z1 to be set from zero to one. The differential current Id is now greater than zero and amounts by way of example to Id0.

At the point in time t2, a further of the brake resistors Ri+1 to Rn in the second subgroup UG2 fails which again causes a differential current jump S in the positive variation direction and the first counter reading Z1 to be increased from one to two. The differential current Id has now doubled and amounts by way of example to 2*Id0.

At the point in time t3, in the exemplary embodiment in accordance with FIG. 4 a first of the brake resistors R1-Ri in the first subgroup UG1 fails which causes a differential current jump S in the negative variation direction and the second counter reading Z2 to be set from zero to one. The differential current Id reduces in this case according to amount because the differential current jump S in the negative variation direction compensates for one of the previous differential current jumps S in the positive variation direction. The differential current Id now amounts again to Id0.

At the point in time t4, a second of the brake resistors R1–Ri in the first subgroup UG1 fails which causes a further differential current jump S in the negative variation direction and the second counter reading Z2 to be set from one to two. The differential current Id again reduces in this case according to amount because the differential current jump S in the negative variation direction compensates for one of the previous differential current jumps S in the positive variation direction.

The differential current Id now amounts again to zero. At this point in time t4, the differential current Id thus no longer shows a fault since it corresponds to the differential current Id(t=0) in the error-free starting state.

At the point in time t5, in the exemplary embodiment in accordance with FIG. 4, a third of the brake resistors R1-Ri in the first subgroup UG1 fails which causes a further differential current jump S in the negative variation direction and the second counter reading Z2 to be set from two to three. The differential current Id again reduces in this case and now amounts to −Id0.

In summary, the evaluating facility 50 monitors the differential current Id or the corresponding measured value M with regard to its progression over time and counts failure events so that the information as to how many of the brake resistors R1-Rn in each of the two subgroups UG1 and UG2 have failed in the meantime is always available.

Figure 5:
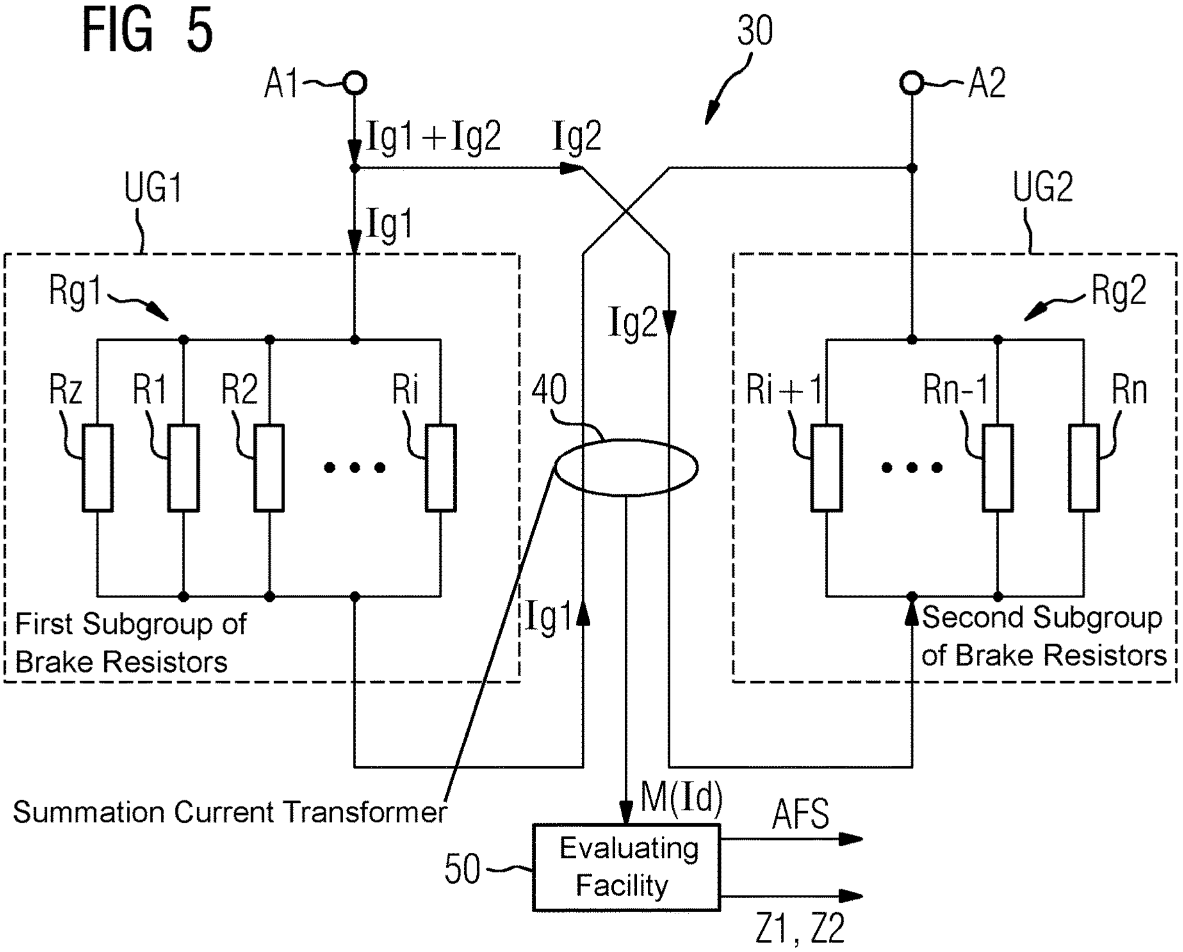
FIG. 5 shows a further exemplary embodiment for a brake resistor assembly for the rail vehicles in accordance with FIGS. 1 and 2.

FIG. 5 shows further in detail a further exemplary embodiment for a brake resistor assembly 30 that can be used in the high-speed rail vehicles 10 in accordance with FIG. 1 or 2.

The brake resistor assembly 30 in accordance with FIG. 5 comprises a first and a second subgroup UG1 and UG2 that in each case have one or more brake resistors. The first subgroup UG1 comprises the brake resistors R1-Ri and the second subgroup UG2 comprises the brake resistors Ri+1 to Rn (with n>i). The brake resistors R1-Rn are connected in each case in parallel in their subgroup UG1 and UG2 and the two subgroups UG1 and UG2 are likewise connected in parallel relative to one another.

In relation to the summation current transformer 40 and the evaluating facility 50, the statements made in relation to FIG. 3 apply accordingly.

In the exemplary embodiment in accordance with FIG. 5, in an exemplary manner it is assumed that the resistance value Rg1 of the first subgroup UG1 is lower than the resistance value RG2 of the second subgroup UG2 and also the corresponding conductivity values are of unequal size, in other words the following applies:

$$Rg1 \neq Rg2$$

The disparity in the resistance values RG1 and RG2 of the two subgroups UG1 and UG2 can be achieved in a simple manner and with a minimal number of different components if all the brake resistors R1-Rn of the two subgroups UG1 and UG2 (taking into consideration usual component tolerances or at least nominally) are of equal size and in the case of the first subgroup UG1 an additional resistor Rz is connected in parallel.

If it is assumed that when the brake resistor assembly 30 is brought into operation overall these operate in an error-free manner and all the brake resistors R1-Rn have a part current flowing through them, then the differential current Id—in contrast with the exemplary embodiment in accordance with FIG. 1—is not equal to zero from the outset owing to the additional resistor Rz. FIG. 5 indicates this by way of example with a differential current Id=I0/2 in the error-free starting state.

The differential current Id in the error-free starting state renders possible a further error monitoring of the entire brake resistor assembly 30. If a current flow through the brake resistor assembly 30 is completely interrupted, in other words the entire brake resistor assembly 30 fails, then differential current Id will drop to zero. In this case, the evaluating facility 50 generates a failure signal AFS that indicates this total failure.

Figure 6:
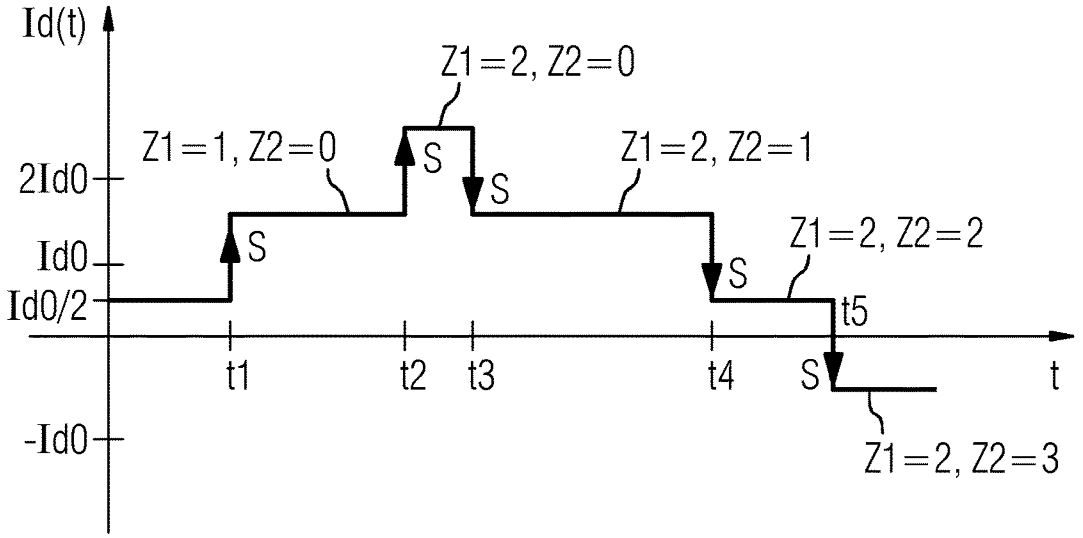
FIG. 6 shows a possible progression over time of differential current jumps in the case of failures of brake resistors of the brake resistor assembly in accordance with FIG. 5.

If in one of the subgroups UG1 and UG2 one of the brake resistors R1-Rn now fails and current no longer flows through it, this will have an effect on the differential current Id as this is explained above in relation to FIGS. 3 and 4. If the failure scenario that is explained by way of example in relation to FIGS. 3 and 4 is assumed having initially two failures in the second subgroup UG2 and three subsequent failures in the first subgroup UG1, a progression thus occurs to differential current jumps and counter readings Z1 and Z2 as is illustrated in an exemplary manner in FIG. 6 during a braking operation.

LIST OF REFERENCE CHARACTERS

- 10 Rail vehicle
- 11 Vehicle shell
- 20 Braking facility
- 21 Generator
- 30 Brake resistor assembly
- 40 Summation current transformer
- 50 Evaluating facility
- A Section
- A1 Connector
- A2 Connector
- AFS Failure signal
- d Spacing
- F Airstream
- i Natural number
- I Braking current
- Id Differential current
- Ig1 Subgroup current
- Ig2 Subgroup current
- M Measured value
- n Natural number
- P Arrow direction
- R Brake resistor
- Rg1 Resistance value
- Rg2 Resistance value
- Rz Additional resistor
- S Differential current jumps
- t Time
- t1-t5 Point in time
- UG1 Subgroup
- UG2 Subgroup
- X Vehicle longitudinal direction
- Z1 Counter reading
- Z2 Counter reading

The invention claimed is:

1. A vehicle or rail vehicle, comprising:

at least one brake resistor assembly having electrical brake resistors for receiving electrical braking energy during a braking operation of the vehicle and for converting the electrical braking energy into waste heat;

said brake resistors being divided into a first subgroup and a second subgroup;

said first and second subgroups being electrically interconnected in parallel; and an evaluating facility monitoring a functional capability of said brake resistors based on a measured value indicating a differential current between a first subgroup current flowing through said first subgroup and a second subgroup current flowing through said second subgroup;

said evaluating facility monitoring a progression of the differential current over time and in an event of differential current jumps detecting a respective jump direction of the differential current jumps and generating a first counter reading and a second counter reading;

the first counter reading indicating a number of jumps in one of two possible variation directions and thus a number of failed brake resistors in one of said first and second subgroups; and the second counter reading indicating a number of jumps in another of the two possible variation directions and thus a number of failed brake resistors in another of said first and second subgroups.

2. The vehicle according to claim 1, which further comprises:

a summation current transformer through which the first and second subgroup currents are conducted with inverse current flow direction relative to one another;

said summation current transformer generating the measured value indicating the differential current between the first and second subgroup currents and outputting the measured value to said evaluating facility.

3. The vehicle according to claim 1, wherein said first and second subgroups have resistance values of equal size.

4. The vehicle according to claim 3, wherein said brake resistors in said respective subgroups are connected in parallel, and said brake resistors have resistance values of equal size.

5. The vehicle according to claim 1, wherein said evaluating facility generates a deviation signal upon the measured value indicating that the differential current exceeds a predetermined base threshold value according to amount.

6. A vehicle or rail vehicle, comprising:

at least one brake resistor assembly having electrical brake resistors for receiving electrical braking energy during a braking operation of the vehicle and for converting the electrical braking energy into waste heat;

said brake resistors being divided into a first subgroup and a second subgroup;

said first and second subgroups being electrically interconnected in parallel; and an evaluating facility monitoring a functional capability of said brake resistors based on a measured value indicating a differential current between a first subgroup current flowing through said first subgroup and a second subgroup current flowing through said second subgroup;

said first and second subgroups having resistance values, said brake resistors having resistance values, the resistance value of said first subgroup being smaller by an additional resistance value than the resistance value of said second subgroup, and the additional resistance value is being greater than the resistance value of each individual brake resistor of said first subgroup.

7. The vehicle according to claim 6, wherein said first subgroup has an additional resistor having the additional resistance value and being connected in parallel to said brake resistors of said first subgroup, and the additional resistance value of said additional resistor is between 1.5 times and 2.5 times a greatest resistance values of said brake resistors of said first subgroup.

8. The vehicle according to claim 7, wherein said first and second subgroups have an equal number of said brake resistors connected in parallel having resistance values of equal size, and said first subgroup additionally has said additional resistor.

9. The vehicle according to claim 6, wherein said first and second subgroups have an equal number of said brake resistors connected in parallel, and resistance values of said brake resistors of said first and second subgroups are of equal size except for one resistor in one of said subgroups.

10. The vehicle according to claim 6, wherein said evaluating facility generates a failure signal upon the measured value indicating that the differential current is zero during a braking operation of the vehicle.

11. The vehicle according to claim 7, wherein:

said evaluating facility generates a deviation signal upon the measured value indicating a differential current deviating from a predetermined desired differential current value or deviating from the predetermined desired differential current value by more than a predetermined extent, according to amount, during a braking operation of the vehicle;

the desired differential current value corresponds to a current flow that would have to be caused by the additional resistance value or would have to flow through said additional resistor upon both said first and second subgroups being free of failure during the braking operation.

12. The vehicle according to claim 6, wherein:

said evaluating facility monitors a progression of the differential current over time and in an event of differential current jumps, detects a respective direction of differential current jumps and generates a first counter reading and a second counter reading;

the first counter reading indicates a number of jumps in one of two possible variation directions and thus a number of failed brake resistors in one of said first and second subgroups; and the second counter reading indicates a number of jumps in another of the two possible variation directions and thus a number of failed brake resistors in another of said first and second subgroups.

13. A method for monitoring electrical braking resistors of a vehicle, the electrical braking resistors configured to receive electrical braking energy and convert the electrical braking energy into waste heat during braking operation of the vehicle, the method comprising:

dividing the brake resistors into first and second subgroups electrically connected in parallel;

monitoring a functional capability of the brake resistors based on a measured value indicating a differential current between a first subgroup current flowing through the first subgroup and a second subgroup current flowing through the second subgroup; and carrying out the method in the vehicle according to claim 6.

14. A method for monitoring electrical braking resistors of a vehicle, the electrical braking resistors configured to receive electrical braking energy and convert the electrical braking energy into waste heat during braking operation of the vehicle, the method comprising:

dividing the brake resistors into first and second subgroups electrically connected in parallel;

monitoring a functional capability of the brake resistors based on a measured value indicating a differential current between a first subgroup current flowing through the first subgroup and a second subgroup current flowing through the second subgroup; and carrying out the method in the vehicle according to claim 1.

* * * * *